(12) United States Patent
Dodds

(10) Patent No.: US 11,667,001 B2
(45) Date of Patent: Jun. 6, 2023

(54) NINETY DEGREE AUTO CHANGER SPINDLE MOUNTING ASSEMBLY

(71) Applicant: Air Turbine Technology, Inc., Boca Raton, FL (US)

(72) Inventor: Kemma Dodds, Boca Raton, FL (US)

(73) Assignee: Air Turbine Technology, Inc., Boca Raton, FL (US)

( * ) Notice: Subject to any disclaimer, the term of this patent is extended or adjusted under 35 U.S.C. 154(b) by 399 days.

(21) Appl. No.: 17/253,338

(22) PCT Filed: Jun. 6, 2019

(86) PCT No.: PCT/US2019/035696
§ 371 (c)(1),
(2) Date: Dec. 17, 2020

(87) PCT Pub. No.: WO2019/236784
PCT Pub. Date: Dec. 12, 2019

(65) Prior Publication Data
US 2021/0260708 A1    Aug. 26, 2021

Related U.S. Application Data

(60) Provisional application No. 62/681,441, filed on Jun. 6, 2018.

(51) Int. Cl.
*B23Q 5/06*    (2006.01)
*B23Q 3/157*   (2006.01)
(Continued)

(52) U.S. Cl.
CPC ............ *B23Q 5/045* (2013.01); *B23Q 5/06* (2013.01); *B23Q 3/157* (2013.01);
(Continued)

(58) Field of Classification Search
CPC ............ B23Q 5/045; B23Q 5/06–5/08; B23Q 2705/04; B23Q 2220/008;
(Continued)

(56) References Cited

U.S. PATENT DOCUMENTS 3,101,014 A * 8/1963 Geissler ................ B23B 45/042
                                                      173/159
3,325,899 A * 6/1967 Staunt ..................... A61C 1/141
                                                      81/461
(Continued)

FOREIGN PATENT DOCUMENTS

CN    106891194 A  *  6/2017
DE    19917693 A1  * 10/2000
(Continued)

OTHER PUBLICATIONS

Machine Translation of FR 2662104, which FR '104 was published Nov. 1991.*

(Continued)

*Primary Examiner* — Erica E Cadugan
(74) *Attorney, Agent, or Firm* — Fleit Intellectual Property Law; Jon Gibbons

(57) ABSTRACT

A novel mounting assembly used with an air spindle is described. The mounting assembly includes an insertable top portion for inserting into a mounting collar and to be rotatable therein, the insertable top portion formed with an upper disk shape with a first diameter and a lower disk shape with a second diameter and adjacent to the upper disk shape, an outer circumference of the upper disk shape having a groove formed therein, and the upper disk shape and the lower disk shape having a passage axially formed therethrough perpendicular to the groove. The mounting assembly further includes a sleeve disposed below the insertable top portion, the sleeve defining an opening with a sidewall which is perpendicular to the insertable top portion, the (Continued)

opening sized to hold a spindle, a port inside a wall of the sleeve defining the opening providing fluid communications with the passage of the insertable top portion.

18 Claims, 11 Drawing Sheets

(51) Int. Cl.
   *B23Q 5/04* (2006.01)
   *B23Q 3/155* (2006.01)
(52) U.S. Cl.
   CPC ............... *B23Q 2003/1558* (2013.01); *B23Q 2220/008* (2013.01); *B23Q 2705/04* (2013.01); *Y10T 409/309296* (2015.01); *Y10T 483/1738* (2015.01)
(58) Field of Classification Search
   CPC . B23Q 5/043–5/048; B23Q 2003/1558; Y10T 409/309296; Y10T 409/30448; Y10T 483/1738; Y10S 415/904; B23B 35/00–49/06; F05D 2240/90; F01D 1/34–1/36; F01D 15/06–15/062; F01D 15/067
   USPC .................. 409/230, 144; 415/904; 483/32
   See application file for complete search history.

(56) References Cited

U.S. PATENT DOCUMENTS

| | | | |
|---|---|---|---|
| 4,141,671 A * | 2/1979 | Tarsoly | ................... F01D 15/06 408/124 |
| 5,025,548 A | 6/1991 | Justensen et al. | |
| 5,697,739 A | 12/1997 | Lewis et al. | |
| 6,939,094 B2 * | 9/2005 | Konishi | ................. B23Q 5/048 409/230 |
| 2008/0093094 A1* | 4/2008 | Bryan | ...................... B23Q 5/06 409/230 |
| 2009/0060673 A1 | 3/2009 | Mace | |
| 2009/0123247 A1* | 5/2009 | Clark | ..................... B23Q 5/045 409/231 |
| 2010/0119318 A1 | 5/2010 | Morris | |
| 2013/0190153 A1 | 7/2013 | Dodds | |
| 2014/0018219 A1* | 1/2014 | Dodds | ................ B23Q 3/15706 483/19 |
| 2016/0184941 A1 | 6/2016 | Kao et al. | |
| 2016/0250730 A1 | 9/2016 | Dotan et al. | |
| 2022/0219271 A1* | 7/2022 | Chen | ..................... B23Q 5/045 |

FOREIGN PATENT DOCUMENTS

| | | | |
|---|---|---|---|
| FR | 2662104 A | * | 11/1991 |
| GB | 2166374 A | * | 5/1986 |
| JP | 59-042230 A | * | 3/1984 |
| WO | WO-01/83160 A1 | * | 4/2001 |

OTHER PUBLICATIONS

International Search Report for PCT/US19/35696, dated Aug. 16, 2019.

* cited by examiner

RADIAN SCALE FOR SHOWING AN AMOUNT OF ROTATION OF THE INSERTABLE TOP PORTION

FIG. 11

NINETY DEGREE AUTO CHANGER SPINDLE MOUNTING ASSEMBLY

CROSS-REFERENCE TO RELATED APPLICATION

This application claims priority from and is related to the following prior application, United States Provisional Application No. 62/681,441, filed Jun. 11, 2018 entitled "Ninety Degree Auto Changer Spindle Mounting Assembly". This prior application, including the entirety of the written description and drawing figures, is hereby incorporated into the present application by reference.

FIELD OF THE INVENTION

This disclosure relates generally to machining processes and more specifically to an apparatus and method for machining.

BACKGROUND

Computer Numerical Control (CNC) machines are utilized in machining processes, and utilize a computer controller that typically reads G-code instructions for driving a powered mechanical device that is used to fabricate metal components by the selective removal of metal. CNC can do numerically directed interpolation of a cutting tool in the work envelope of a machine.

The powered mechanical device is often a pneumatic tool (e.g., a drill) that is fitted for coupling with the CNC machine, such as by insertion into and withdrawal from a CNC machine. The pneumatic tools or spindles can be manually coupled with the CNC machine or an automatic tool changer can be utilized.

Some tools are available from a CNC tool magazine but require that the machine be stopped after change-over so that suitable power connections can be established with the tool. Other tools are pre-connected to the pneumatic source but must be manually engaged with the CNC machine. Thus, CNC machines are typically programmed to stop prior to the normal machining cycle to permit manual tool installation or the creation of a suitable power link with the tool after coupling with the machine.

SUMMARY

An apparatus and method for machining is provided. The features of the examples described herein can allow for machining while facilitating the tool-exchanging process. These features can also provide flexibility in using various types of tools with the CNC machine or other control devices.

The presently claimed invention provides an apparatus and method for machining that facilitates the tool-exchanging process. The present invention further provides an apparatus and method that provides flexibility to use various types of tools that work on a plane parallel to the earth.

More specifically, disclosed is a ninety degree mounting assembly used with an air spindle, the mounting assembly. The ninety degree mounting assembly includes an insertable top portion for inserting into a mounting collar and to be rotatable therein, the insertable top portion formed with an upper disk shape with a first diameter and a lower disk shape with a second diameter and adjacent to the upper disk shape, an outer circumference of the upper disk shape having a groove formed therein, and the upper disk shape and the lower disk shape having a passage axially formed therethrough perpendicular to the groove. The ninety degree mounting assembly further includes a sleeve disposed below the insertable top portion, the sleeve with an inner sidewall and outer sidewall defining an opening surrounding the inner sidewall which is perpendicular to the insertable top portion, the opening is sized to hold a spindle. The sleeve further defines a port formed in the inner sidewall. The port of the sleeve provides fluid communications with the passage of the insertable top portion. The sleeve further comprises an edge formed next to the opening. The edge defining an arcuate-shaped channel that is concentric with the opening with a given depth. An inner sidewall slot is formed in the inner sidewall. The arcuate-shaped channel extends into an interior portion between the inner sidewall and the outer sidewall that is away from the edge. The sidewall slot is in fluid communication with the arcuate-shape channel to allow exhaust air from the spindle to pass into the sidewall slot through the arcuate-shape channel.

In one example, the sidewall further defines one or more holes perpendicular thereto for securing the spindle within the opening.

In another example, the first diameter of the upper disk is smaller than the second diameter of the lower disk in the ninety degree mounting assembly.

In still another example, the ninety degree mounting assembly further includes an end cap with an end cap body, the end cap body includes an end cap opening therethrough to accept the insertable top portion to enable 360-degree rotation of the insertable top portion with respect to the end cap. The ninety degree mounting assembly includes a collar with a mounting collar and a collar arm, the mounting collar defines a collar opening therethrough to accept the end cap.

In a different example, the ninety degree mounting assembly further includes an end-cap with an outer sidewall for defining an end-cap opening therethrough to accept the insertable top portion to enable 360 degree rotation of the insertable top portion with respect to the collar. The mounting assembly includes a radian-scale disposed on the outer sidewall for showing an amount of rotation of the insertable top portion with respect to the collar.

The above-described and other features and advantages of the present disclosure will be appreciated and understood by those skilled in the art from the following detailed description, drawings, and appended claims.

BRIEF DESCRIPTION OF THE DRAWINGS

FIG. 10 is a side view of a spindle and mounting collar assembly of the system of.

FIG. 1 with a different quick change end adapter;

FIG. 11 schematically shows a feature of the mounting assembly; and

FIG. 12 schematically shows an auto changer device for exchanging the spindles 142 between the CNC machine 104 and the tool carousel 140.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e., open language). The term "coupled" as used herein, is defined as "connected" although not necessarily directly, and not necessarily mechanically.

The term "air" is intended to broadly cover many different types of fluids, including oil mixed with air. Various materials or combinations of materials can be used to construct the mounting collar assembly and its components. For example, materials such as metals, alloys, composites, plastics, ceramics, and other inorganic or organic materials or combinations thereof may be used.

Machining System—102

Figure 1:
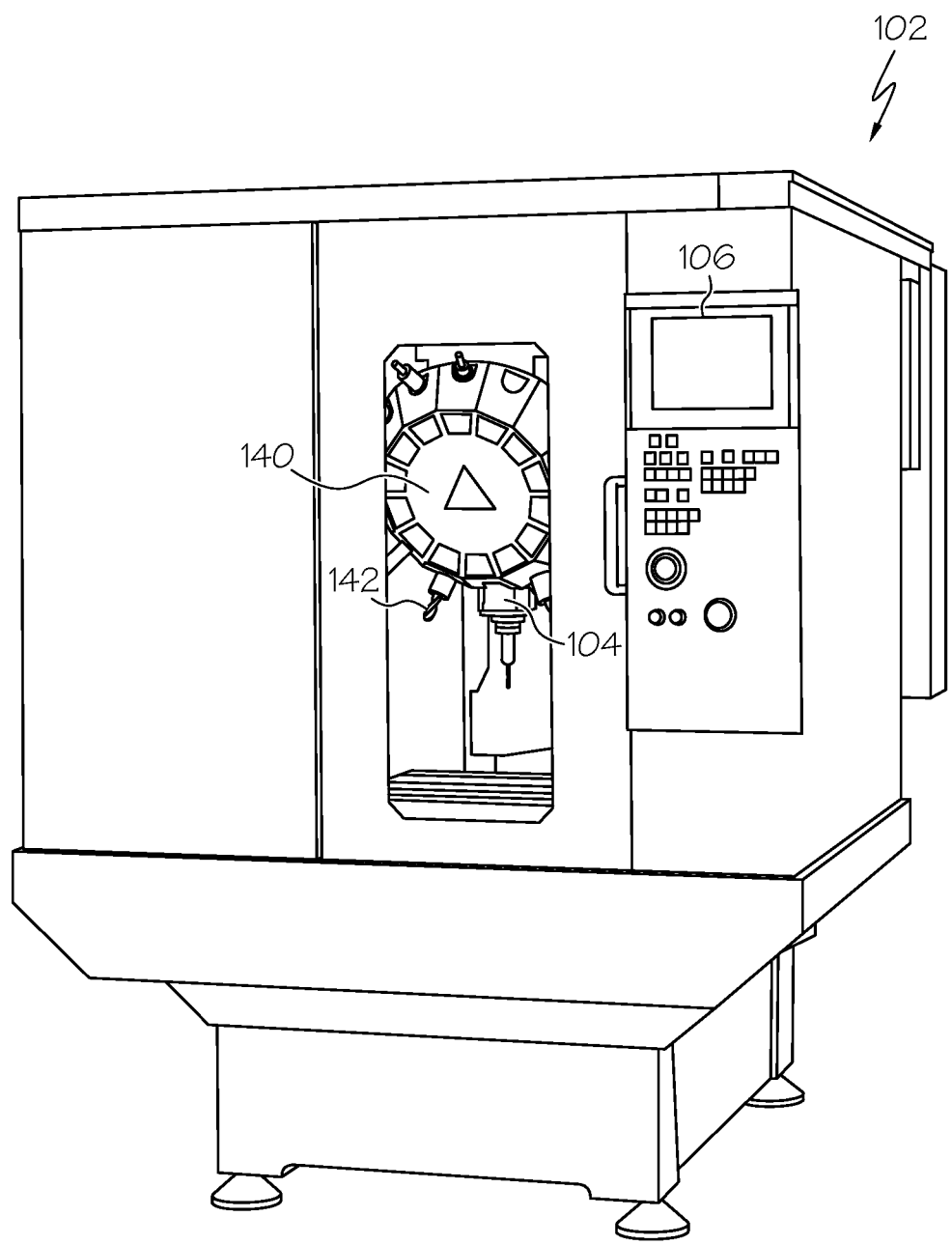
FIG. 1 is a perspective view of an exemplary machining system according to an embodiment of the present invention.
Figure 2:
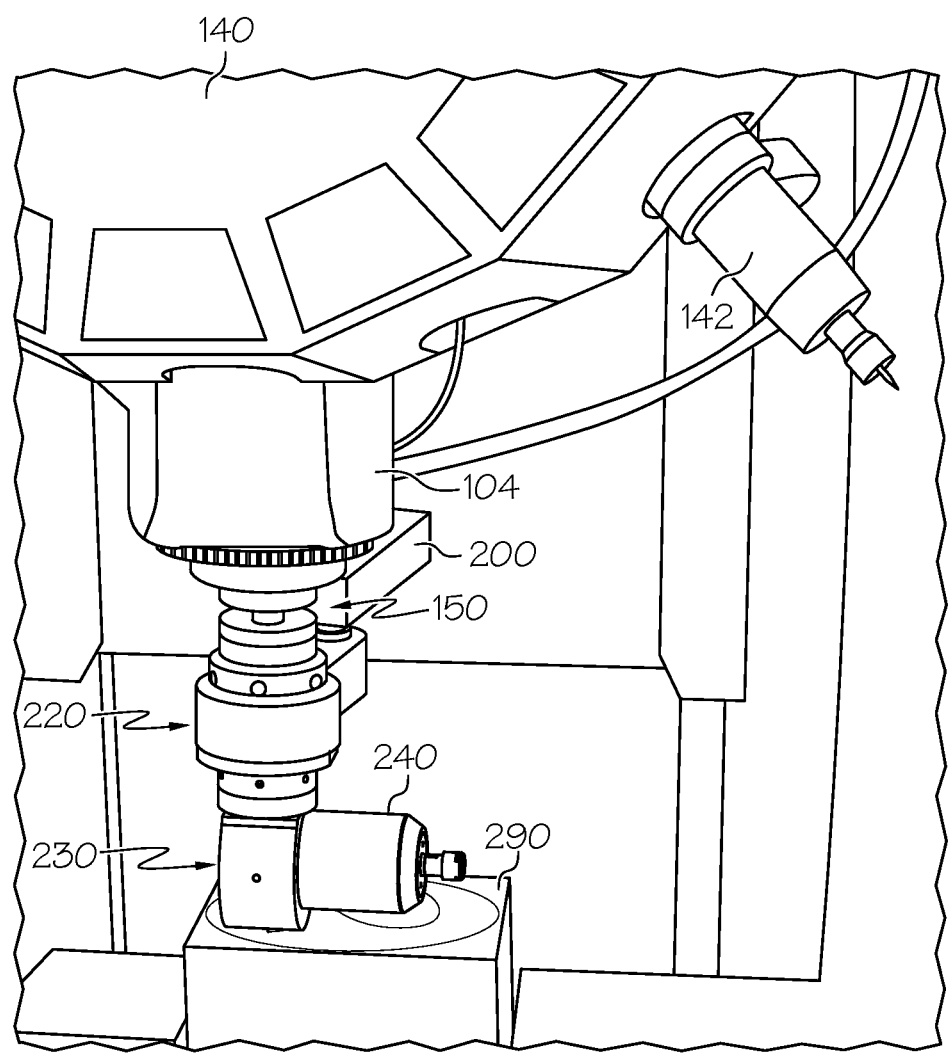
FIG. 2 is a perspective view of another portion of the system of FIG. 1.

Referring to the drawings and in particular to FIGS. 1-2, a machining system is shown and generally represented by reference numeral 102. System 102 can include a control device 104, such as a CNC machine, a tool carousel 140, and one or more tools or spindles 142. The control device 104 can include a user input device 106 for inputting commands. The control device 104 can utilize various computational hardware and software to implement a machining process on a workpiece, and the present disclosure is not intended to be limited based upon the type of control utilized.

The system 102 can also have a universal spindle mounting assembly (USMA) 150 that cooperates with the spindles 142 to allow for the automatic exchanging of the spindles with the CNC machine 104. In the exemplary embodiment of system 102, the spindles 142 are exchanged between the CNC machine 104 and the tool carousel 140 by way of an auto changer device. However, the present disclosure contemplates the use of other structures and techniques for connecting and disconnecting the spindles 142 with the CNC machine 104 through the use of the USMA 150, such as a linear carousel.

Referring to FIG. 2, the USMA 150 can include a mounting collar 220 and a mounting block or manifold body 200. The mounting collar 220 can be operably coupled to a ninety degree mounting assembly 230, which holds the spindle 240 parallel to the earth as shown, while the mounting block or manifold body 200 can be operably coupled to the CNC machine 104. A workpiece is machined with system 102.

Ninety Degree Mounting Assembly—230

Figure 3:
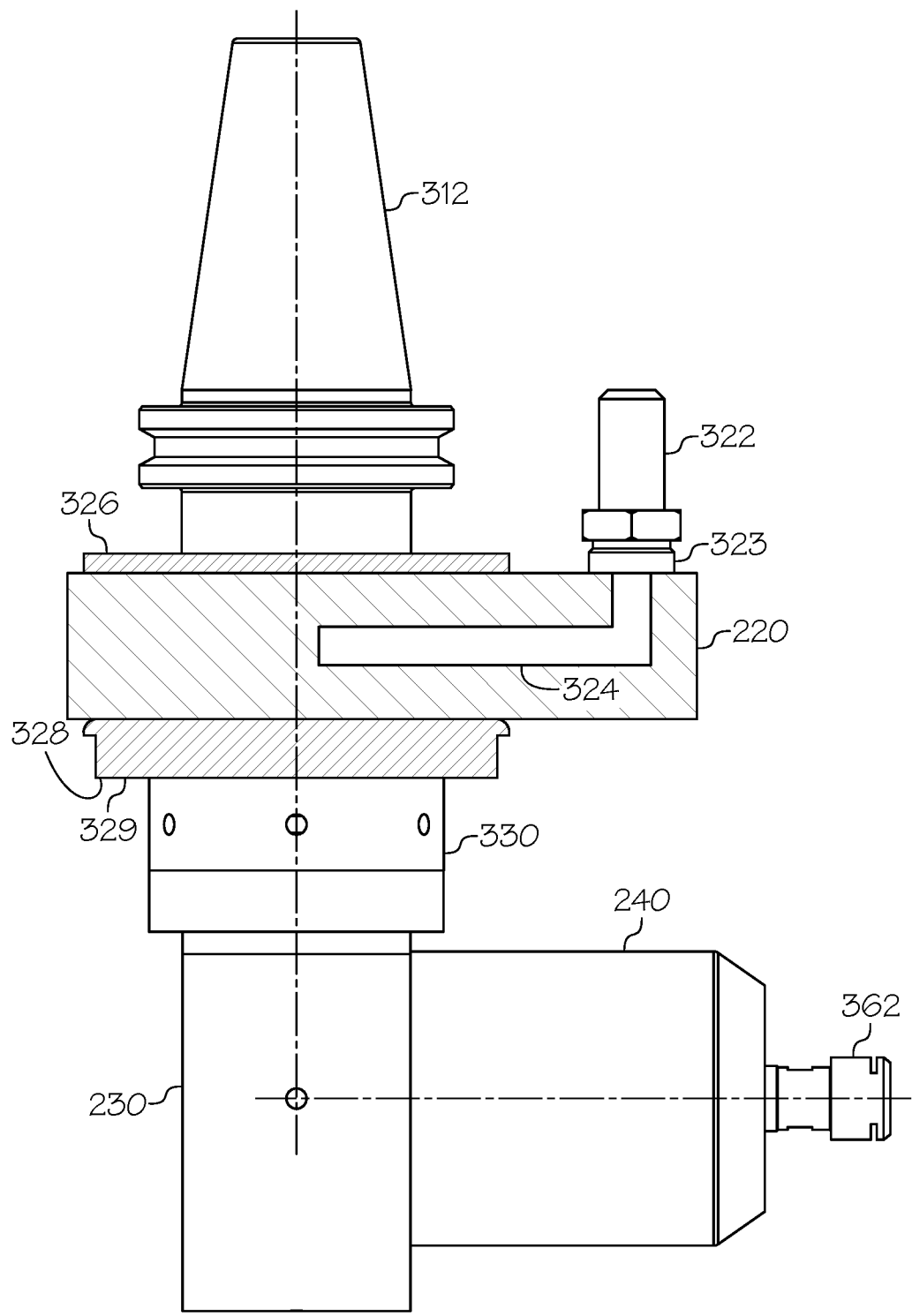
FIG. 3 is a side view of a spindle and mounting collar assembly of the system of FIG. 1.

FIG. 3 is a side view of a spindle and the ninety degree mounting assembly 230 of the system of FIG. 1. Beginning from the top shown is a (USMA) 150 to mechanically couple with CNC machine 104. Next is a mounting collar 220. Mounting collar 220 includes a top side 326 and a bottom side 328. The mounting collar 220 includes a collar opening 329, which is formed therethrough between the top side 326 and bottom side 328 as shown.

The mounting collar 220 includes a passage 324 in fluid communication between an air inlet assembly 322 and the collar opening 329. The air inlet assembly 322 has a threaded end 323 for inserting into a mounting collar 220. In one example, air inlet assembly 322 includes a spring-loaded check valve that opens above a given pressure to allow liquid, such as air, to flow into the air inlet assembly 322. The use of a check-valve greatly reduces any dirt and undesirable debris from entering the air inlet assembly 322. This is especially important when the ninety degree mounting assembly 230 and spindle 240 with cutting tip 362 are stored in the tool carousel and/or not used. In another example, air is directed through the USMA 150 itself (not shown). The mounting collar 220 is mechanically coupled to the mounting collar sleeve 330.

Continuing further, mounting collar sleeve 330 is adapted to mechanically hold the ninety degree mounting assembly 230, which is further describe below. A prior art spindle 240 with cutting tip 362 is also shown. Although the present invention is not limited to a specific type of spindle 240, spindles available from Air Turbine Technologies, Inc. in Boca Raton have been shown to work effectively with the present invention.

Figure 4:
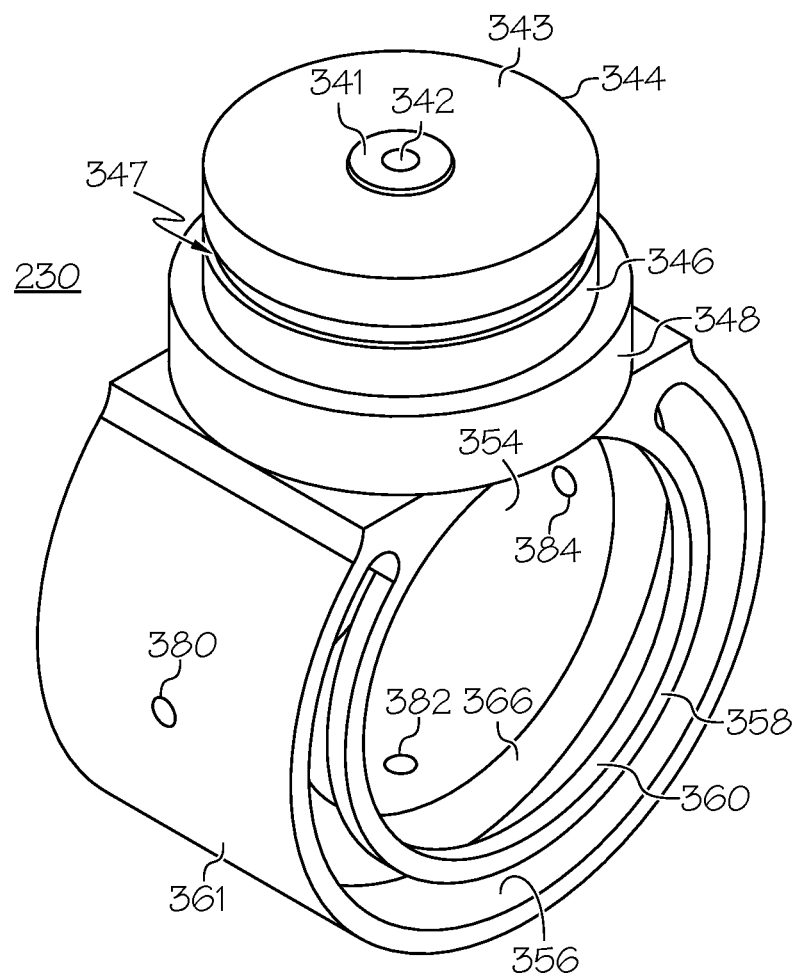
FIG. 4 is a perspective view of the ninety degree mounting assembly of FIG. 3.

FIG. 4 is a perspective view of the ninety degree mounting assembly 230 of FIG. 3. Starting from the top, shown is an insertable top portion 343 for inserting into the mounting collar sleeve 330. The ninety degree mounting assembly 230 is rotatably mounted inside the mounting collar sleeve 330 to allow adjustment in any position 360 degree circular position. In one example, a radian-scale (schematically shown in FIG. 11) is disposed on the outer sidewall of the ninety degree mounting assembly 230 for showing an angle of rotation of the insertable top portion 343 with respect to the mounting sleeve 330.

The insertable top portion 343 is formed with an upper disk shape 344 and a lower disk shape 348. The upper disk shape 344 includes a groove 347 formed therein. This groove 347 defines a bottom portion 346 of the upper disk shape 344 as shown. Also shown is a lower disk shape 348. A sealing channel may include an O-ring (not shown). The diameter of the upper disk shape 344 in one example is smaller than the diameter of the lower disk shape 348 as shown. Also shown, an axial air passage 342 is formed through the insertable top portion 343, including the upper disk shapes 344, 346, and the lower disk shape 348. The axial air passage 342 is illustrated in dashed lines in the side view shown in FIG. 5.

Figure 5:
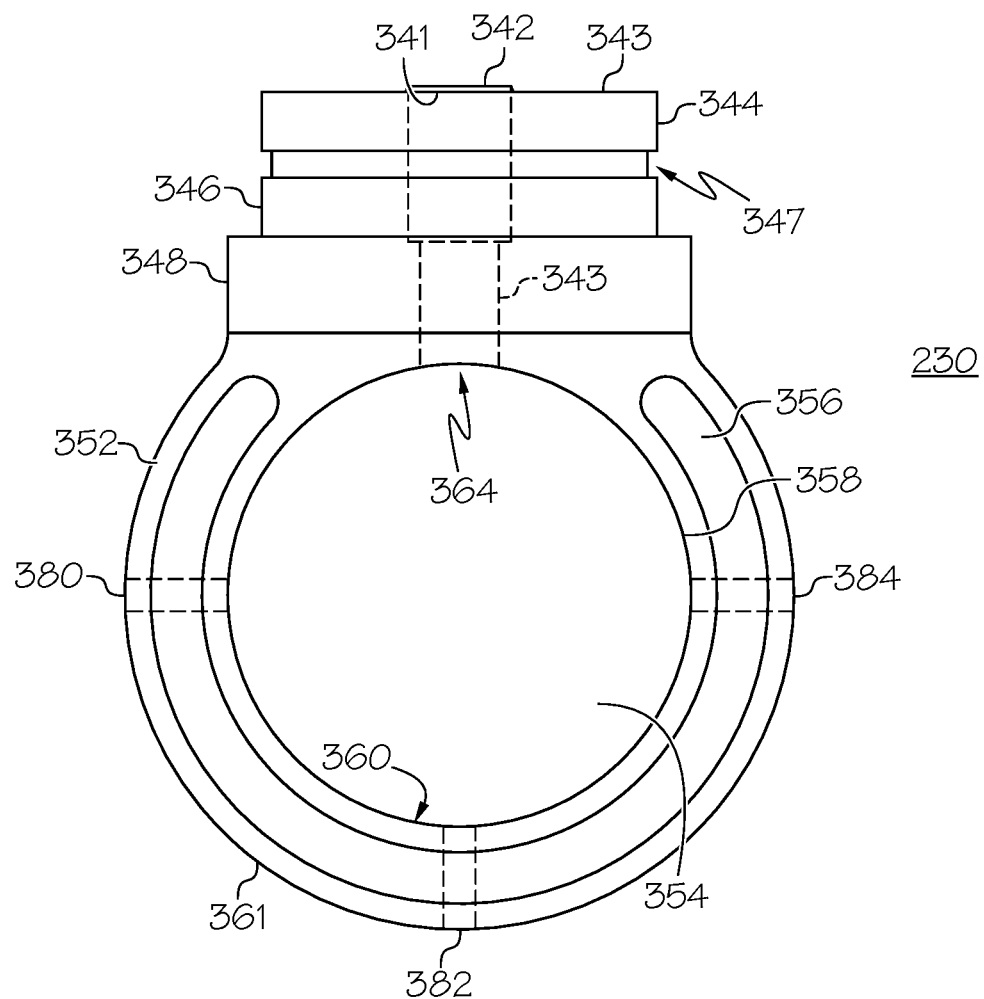
FIG. 5 is a side view of the ninety degree mounting assembly of FIG. 4.

Turning to FIG. 5 is a side view of the ninety degree mounting assembly 230 of FIG. 4. Shown is the ninety degree mounting assembly 230, which includes a sleeve 352 disposed below the insertable top portion 343. The sleeve 352 has a substantially circular opening 354 with an inner sidewall 360 to accommodate the spindle 240. The inner sidewall 360 includes a port 364 in fluid communications with the axial air passage 342. The port 364 is formed to provide pressurized air to the spindle 240. The axial air passage 342 includes an inner sidewall O-ring 341 to seal with the USMA 150. The axial air passage 342 also is formed with a threaded sidewall. A nipple 343 with outer threads is threaded into the threads of the axial air passage 342 to allow pressurize air to pass-thru as well as to secure the spindle 240 to the ninety degree mounting assembly 230. An optional lock screw (not shown) may be used in addition to the nipple 343. The openings 380, 382, and 384 in and perpendicular to sidewalls 360, 361 may be used for securing the spindle in place.

A circular opening 354 is substantially perpendicular to the axial air passage 342. Stated differently, this perpendicular arrangement is ninety degrees (90°) with respect to the USMA 150. Surrounding more than half the circumference of the circular opening 354, the sleeve 352 includes an edge 358 that is formed next to the circular opening 354. The edge 358 defines an arcuate-shaped channel 356 between an inner sidewall 360 and outer sidewall 361, concentric with the circular opening 354, as shown. The arcuate-shaped channel 356 has a depth that extends into an interior portion between the inner sidewall 360 and outer sidewall 361 that is away from the edge 358.

Figure 6:
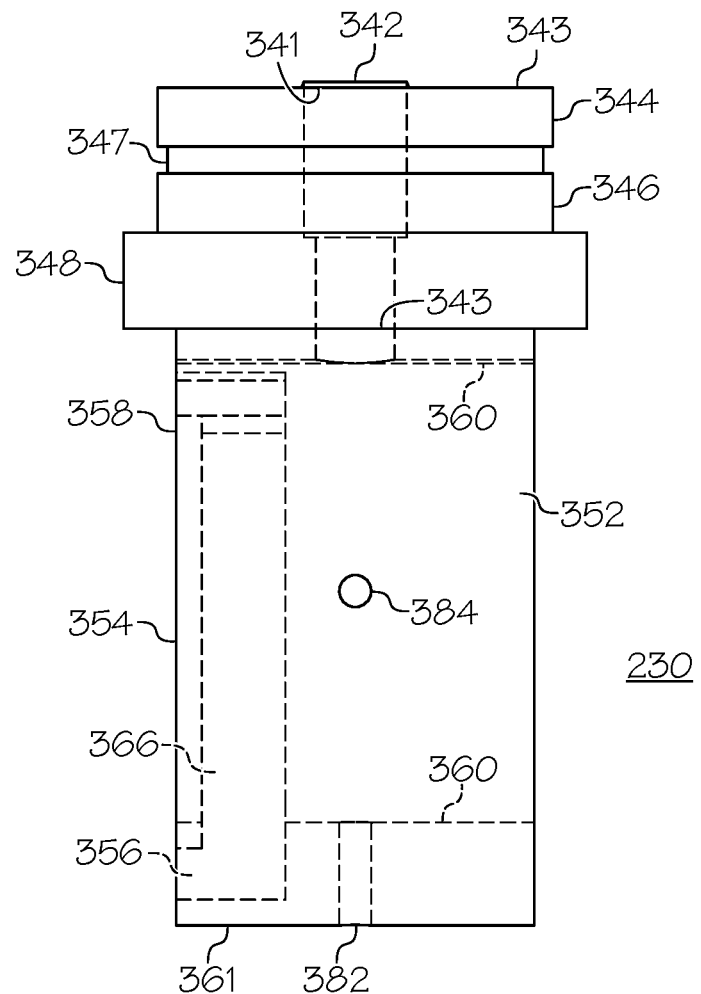
FIG. 6 is another side view of the ninety degree mounting assembly of FIG. 4.

FIG. 6 is another side view of the ninety degree mounting assembly 230 of FIG. 4. Shown is the arcuate-shaped channel 356 with a depth that extends into an inner portion between the inner sidewall 360 and the outer sidewall 361 that is away from the edge 358. An inner sidewall slot 366 is formed in the inner sidewall 360. There is fluid communication between the inner sidewall slot 366 and the arcuate-shaped channel 356 to allow exhaust air from the spindle 240 to pass from the inner sidewall slot 366 out through the arcuate-shaped channel 356.

Figure 7:
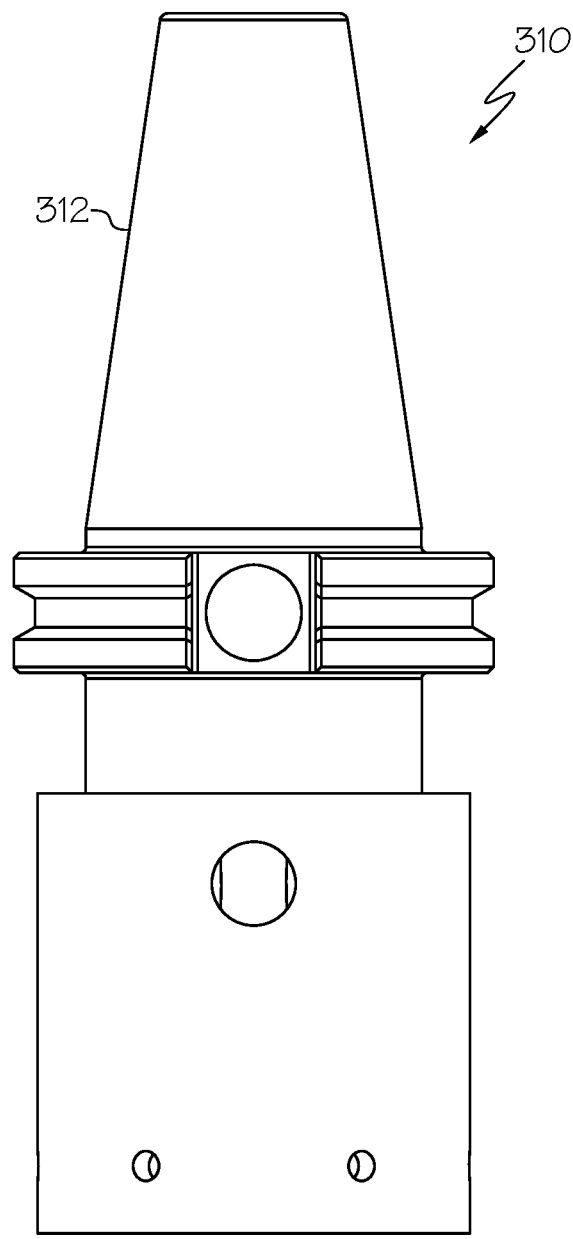
FIG. 7 is a side view of a quick change adapter end.
Figure 8:
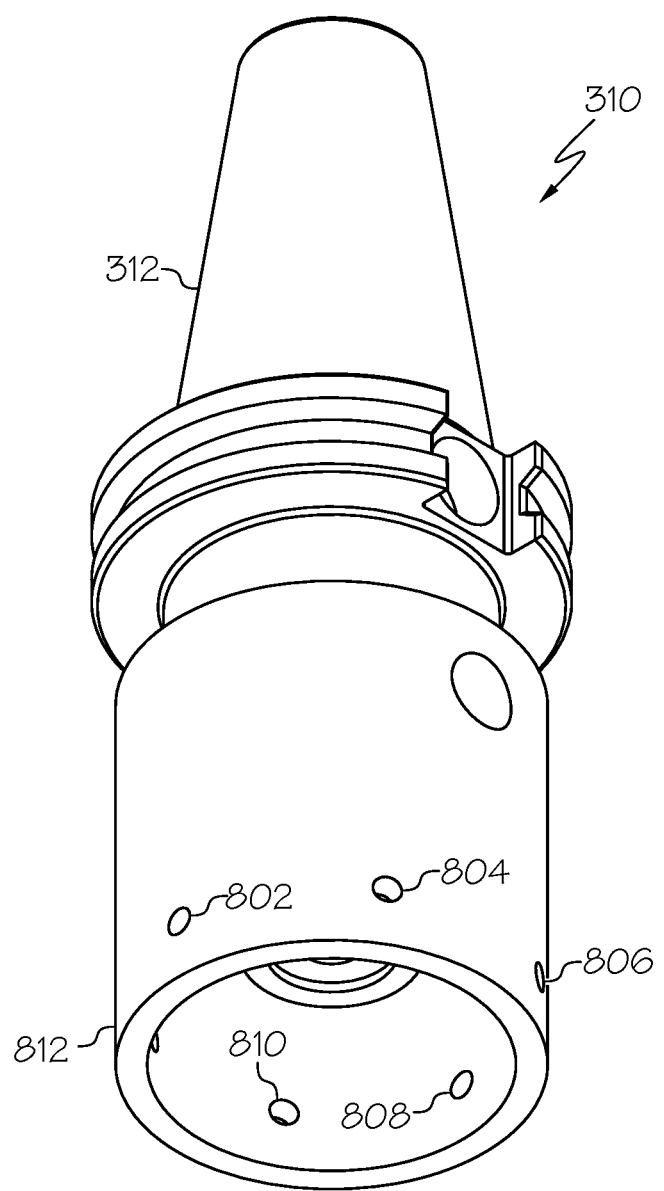
FIG. 8 is a perspective view of the quick change adapter end of FIG. 7.

FIG. 7 is a side view of quick change adapter end 310, such as, universal spindle mounting assembly (USMA) 312. FIG. 8 is a perspective view of quick change adapter end of FIG. 7. Shown is a plurality of openings 802, 804, 806, 808, 810, and 812. These openings 802 through 812 may be threaded and have set screws (not shown) that engage the groove 347 of FIG. 4 to hold the ninety degree mounting assembly 230 into the mounting collar sleeve 330 of FIG. 3.

Figure 9:
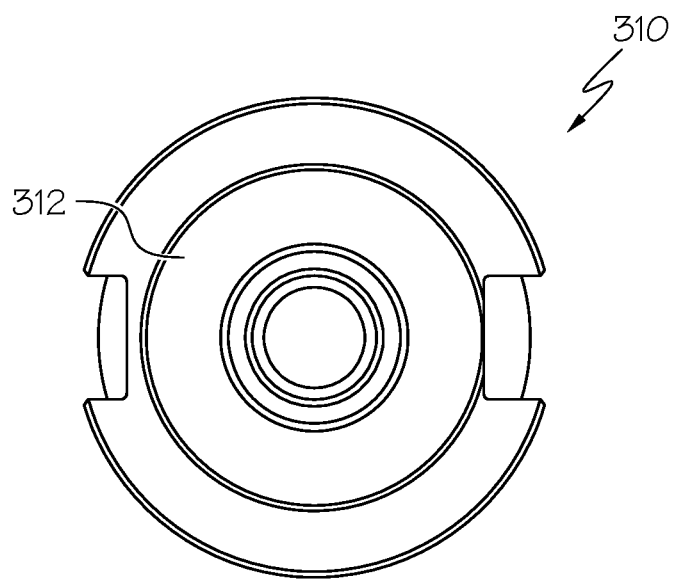
FIG. 9 is a top view of the quick change adapter end of FIG. 7.

FIG. 9 is a top view of the quick change adapter end of FIG. 7.

Figure 10:
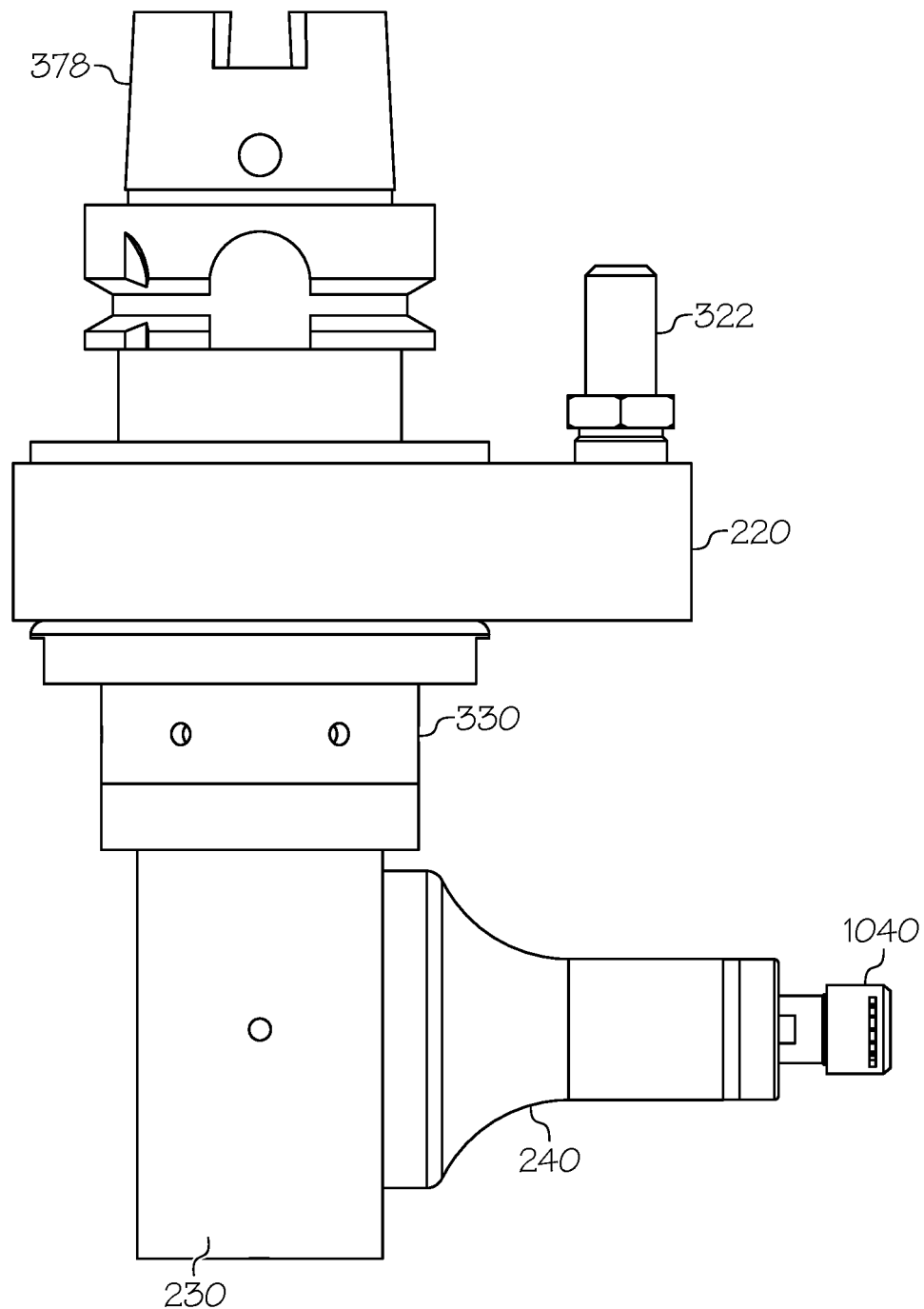

FIG. 10 is a side view of a spindle and the ninety degree mounting assembly 230 of the system of FIG. 1 with a different quick change end adapter 378. Also shown is an example of cutting tip 1040. It is important to note that this cutting tip 1040 is an example only and that other cutting tips are contemplated within the true scope of the present invention.

The ninety degree mounting assembly 230 can be fabricated from various metallic and non-metallic materials, which includes organic and inorganic materials or composites. The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A mounting assembly used with an air spindle, the mounting assembly comprising:
    an insertable top portion for inserting into a mounting collar and to be rotatable therein, the insertable top portion formed with an upper disk shape with a first diameter, and the insertable top portion also formed with a lower disk shape with a second diameter, the lower disk shape being adjacent to the upper disk shape, an outer circumference of the upper disk shape having a groove formed therein, and the upper disk shape and the lower disk shape having a passage axially formed therethrough along a longitudinal axis of the insertable top portion; and
    a sleeve with an inner sidewall and an outer sidewall, the sleeve being disposed below the insertable top portion, the sleeve defining an opening surrounded by the inner sidewall, which opening has a longitudinal center axis that is perpendicular to the longitudinal axis of the insertable top portion, the opening sized to hold the spindle, the sleeve further defining a port formed in the inner sidewall of the sleeve, the port providing fluid communications with the passage of the insertable top portion, the sleeve further comprising an edge formed next to the opening, the edge defining an arcuate-shaped channel that is concentric with the opening and that extends from the edge by a given depth, an inner sidewall slot formed in the inner sidewall, the arcuate-shaped channel extending from the edge into an interior portion of the sleeve between the inner sidewall and the outer sidewall, and the inner sidewall slot is in fluid communications with the arcuate-shaped channel to allow exhaust air from the spindle to pass from the inner sidewall slot through the arcuate-shaped channel.

2. The mounting assembly of claim 1, wherein the first diameter of the upper disk shape is smaller than the second diameter of the lower disk shape.

3. The mounting assembly of claim 1, wherein the sleeve further defines one or more holes formed through the inner sidewall and the outer sidewall and the one or more holes are perpendicular to the sleeve, the one or more holes are used to secure the spindle within the opening.

4. The mounting assembly of claim 1, further including:
    a mounting collar sleeve having an opening to accept the insertable top portion to enable 360 degree rotation of the insertable top portion with respect to the mounting collar sleeve.

5. The mounting assembly of claim 4, further including:
    a radian-scale for showing an amount of rotation of the insertable top portion with respect to the mounting collar.

6. The mounting assembly of claim 4, further comprising:
a gas inlet coupled to the mounting collar;
wherein the mounting collar further defines a passage in fluid communication between the gas inlet and the passage of the insertable top portion.

7. The mounting assembly of claim 6, wherein the gas inlet includes a check valve adapted to allow a gas above a given pressure to pass into the gas inlet.

8. The mounting assembly of claim 4, further comprising:
the spindle.

9. The mounting assembly of claim 4, further comprising:
a Computer Numerical Control machine releasably attached to the mounting collar.

10. The mounting assembly of claim 1, wherein the passage axially formed in the insertable top portion is formed with inner threads and a nipple threaded therein for allowing pressurized gas to pass-thru as well as to secure the spindle to the sleeve.

11. A machining system comprising:
a spindle;
a Computer Numerical Control (CNC) machine;
an auto changer device;
a gas supply line; and
a mounting assembly including:
an insertable top portion for inserting into a mounting collar and to be rotatable therein, the insertable top portion formed with an upper disk shape with a first diameter, and the insertable top portion also formed with a lower disk shape with a second diameter, the lower disk shape being adjacent to the upper disk shape, an outer circumference of the upper disk shape having a groove formed therein, and the upper disk shape and the lower disk shape having a passage axially formed therethrough along a longitudinal axis of the insertable top portion; and
a sleeve with an inner sidewall and an outer sidewall, the sleeve being disposed below the insertable top portion, the sleeve defining an opening surrounded by the inner sidewall, which opening has a longitudinal center axis that is perpendicular to the longitudinal axis of the insertable top portion, the opening sized to hold the spindle, the sleeve further defining a port formed in the inner sidewall of the sleeve, the port providing fluid communications with the passage of the insertable top portion, the sleeve further comprising an edge formed next to the opening, the edge defining an arcuate-shaped channel that is concentric with the opening and that extends from the edge by a given depth, an inner sidewall slot formed in the inner sidewall, the arcuate-shaped channel extending from the edge into an interior portion of the sleeve between the inner sidewall and the outer sidewall, and the inner sidewall slot is in fluid communications with the arcuate-shaped channel to allow exhaust air from the spindle to pass from the inner sidewall slot through the arcuate-shaped channel.

12. The machining system of claim 11, wherein the first diameter of the upper disk shape is smaller than the second diameter of the lower disk shape.

13. The machining system of claim 11, wherein the sleeve further defines one or more holes formed through the inner sidewall and the outer sidewall and the one or more holes are perpendicular to the sleeve, the one or more holes are used to secure the spindle within the opening.

14. The machining system of claim 11, further including:
a mounting collar sleeve having an opening to accept the insertable top portion to enable 360 degree rotation of the insertable top portion with respect to the mounting collar sleeve.

15. The machining system of claim 14, further including:
a radian-scale for showing an amount of rotation of the insertable top portion with respect to the mounting collar.

16. The machining system of claim 14, further comprising:
a gas inlet coupled to the mounting collar;
wherein the mounting collar further defines a passage in fluid communication between the gas inlet and the passage of the insertable top portion.

17. The machining system of claim 16, wherein the gas inlet includes a check valve adapted to allow a gas above a given pressure to pass into the gas inlet.

18. The machining system of claim 11, wherein the passage axially formed in the insertable top portion is formed with inner threads and a nipple threaded therein for allowing pressurized gas to pass-thru as well as to secure the spindle to the sleeve.

* * * * *